Figure 1:
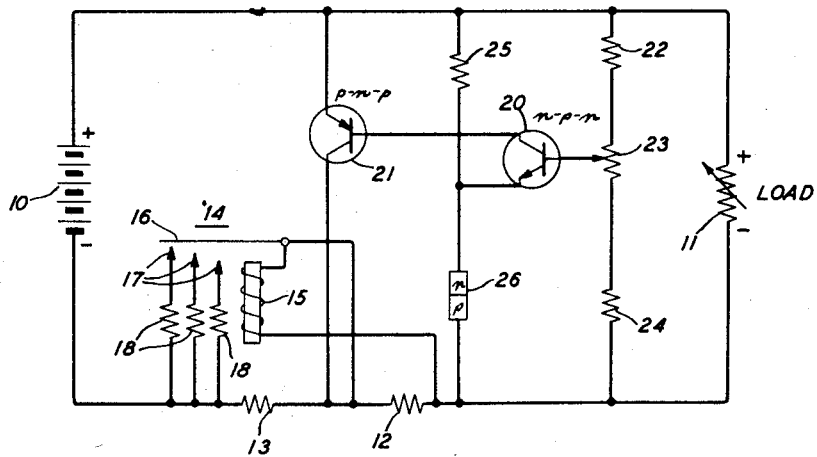

Dec. 15, 1959　　　F. H. CHASE　　　2,917,700

CURRENT SUPPLY APPARATUS

Filed Aug. 2, 1955

INVENTOR
F. H. CHASE
BY
ATTORNEY

United States Patent Office 2,917,700
Patented Dec. 15, 1959

2,917,700
CURRENT SUPPLY APPARATUS

Fay H. Chase, Short Hills, N.J., assignor to Bell Telephone Laboratories, Incorporated, New York, N.Y., a corporation of New York Application August 2, 1955, Serial No. 525,895

10 Claims. (Cl. 323—22)

This invention relates to current supply apparatus and more particularly to apparatus for controlling the supply of current from a current supply source to a load to minimize load voltage changes.

An object of the invention is to provide an improved current supply circuit employing series-type regulation and shunt-type regulation for jointly controlling the voltage drop in a load circuit through which current is supplied to a load.

Another object of the invention is to provide an improved current supply circuit having a series regulator in the load circuit and means responsive to load current for variably shunting a portion of the load circuit including the series regulator to increase the load current operating range of the supply circuit.

Another object of the invention is to provide a current supply circuit having a regulator responsive to load voltage and a regulator responsive to load current for jointly controlling the voltage drop in the circuit through which current is supplied to the load.

The invention is an improvement in certain respects over the shunt-type transistor regulators disclosed in applicant's copending application, Serial No. 385,570, filed October 12, 1953, now Patent No. 2,751,550, June 19, 1956 and over the series-type transistor regulators disclosed in applicant's copending application, Serial No. 412,437, filed February 25, 1954, now Patent No. 2,751,549, June 19, 1956.

In a specific embodiment of the invention, herein shown and described for the purpose of illustration, current is supplied from a direct-current supply source to a load through a load circuit having resistance in series with the supply source and the load. The load voltage is controlled by regulating the voltage drop across the series resistance in the load circuit. The voltage drop across the series resistance is regulated by controlling both the magnitude of the resistance in the load circuit and the current supplied from the supply source through a shunt path to the resistance to supplement the load current flowing therethrough. A shunt-type transistor regulator responsive to load voltage changes is used to control the current flowing through the series resistance in addition to the load current. Means comprising a multicontact electromagnetic device responsive to changes of load current is provided for varying the magnitude of the series resistance in the load circuit.

When the series resistance in the load circuit is fixed, the shunt-type transistor regulator is capable of regulating the load voltage to minimize load voltage changes for a limited range of load current. The shunt-type regulator is usually designed so that, at minimum input voltage and zero load, the shunt current is slightly larger than the maximum expected load current, the shunt current being still larger at maximum input voltage. For a fixed input voltage, as the load current is increased, the shunt current is decreased by a substantially equal amount to maintain the voltage drop across the resistance in the load circuit substantially constant. If, after the shunt current has been reduced substantially to zero, the load current is further increased, the load voltage decreases and the regulator ceases to function to maintain a substantially constant load voltage. By providing means for decreasing the resistance in the load circuit in response to increasing load current, the operating range of load current at substantially constant load voltage is greatly increased while the current through the shunt regulating transistor is maintained within a normal operating range.

Another specific embodiment of the invention, herein shown and described for the purpose of illustration, like the above-described embodiment, employs shunt-type regulation responsive to load voltage changes for controlling the current flowing through series resistance in the load circuit in addition to the load current. There is also provided in the load circuit in series with the load a series transistor regulator responsive to load voltage changes. An advantage of using shunt regulation in addition to the series transistor regulator is that the required voltage drop across the series transistor for a zero load condition is considerably reduced. There is also provided means comprising a multicontact electromagnetic device responsive to load current changes for varying the resistance of a current path shunting the resistance and the transistor which are in series in the load circuit. The provision of such a means greatly increases the current range which can be supplied to the load while maintaining the load voltage substantially constant without exceeding the safe operating limits of the series transistor.

Figure 2:
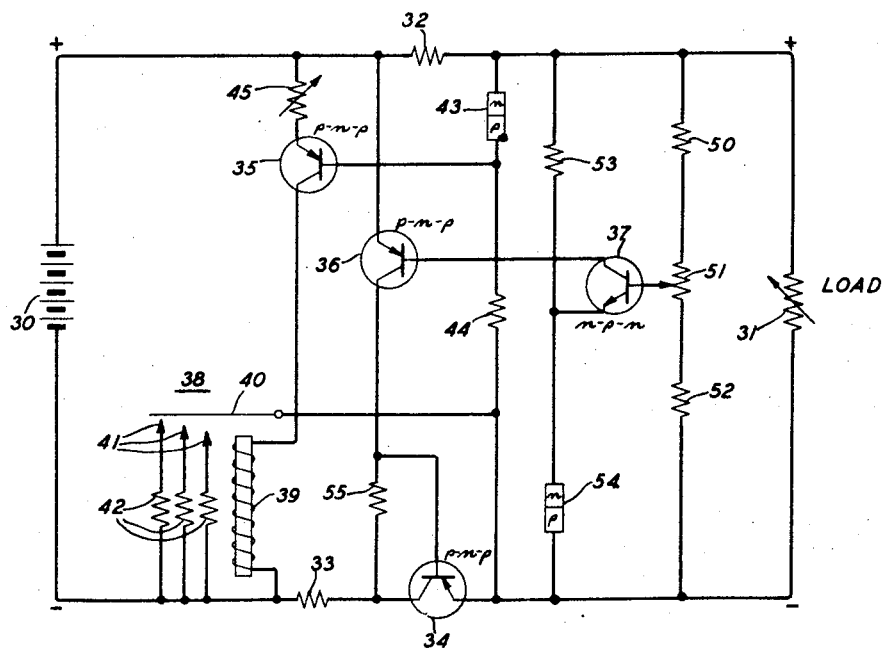

The invention will now be described in greater detail with reference to the accompanying drawing in which:

Figs. 1 and 2 are schematic views of current supply circuits embodying the invention.

Referring now to Fig. 1 of the drawing, there is shown a circuit for supplying current from a battery 10 or other direct-current supply source to a load 11 which may vary through a load circuit comprising resistors 12 and 13 in series in a current path connecting the negative load terminal and the negative terminal of battery 10. There is provided an electromagnetic device 14 having a winding 15 connected across resistor 12, an armature 16 and a plurality of contacts 17. The device 14 is somewhat like an electromagnetic relay having a plurality of contacts, the number of contacts which are simultaneously closed being varied by controlling the current supplied to the relay winding. There are also provided a plurality of resistors 18, one for each contact, each in a path connecting a contact to the common terminal of resistor 13 and battery 10. While only three contacts 17 and three resistors 18 are shown, the device 14 preferably has a larger number of contacts, twenty for example, and an equal number of resistors 18 are provided. The electromagnetic device 14 may be of the type disclosed, for example, in United States Patent No. 2,550,779 to A. M. Cohen, granted May 1, 1951 and in an Application Manual No. 1.00 and in a Bulletin 505.00, both published by Electric Regulator Corporation, Norwalk, Connecticut. As the load current increases, to increase the energization of the winding 15, the contacts 17 are closed in sequence so as to increase the number of shunt paths, each including a resistor 18, which are connected across the resistor 13. When the load current decreases, the number of shunt paths across resistor 13 is similarly reduced by opening the contacts 18 in succession. In this way the resistance in the load circuit in series with the current source 10 and the load 11 is decreased in response to an increase of load current and vice versa. A device of any suitable type may, of course, be used instead of the device 14 for controlling the load circuit resistance in response to load current changes.

A circuit comprising an n-p-n type transistor 20 and a p-n-p type transistor 21 is provided for controlling, in response to load voltage changes, the supply of current from the battery 10 to the resistor 13 and any number of the resistors 18 connected across it to supplement the load current flowing through the resistor 13 and the shunting resistors 18. A voltage divider comprising in series a resistor 22, a potentiometer 23 and a resistor 24 is connected across the load 11. The base of transistor 20 is connected to the variable tap of potentiometer 23. There is also connected across the load a current path comprising in series a resistor 25 and a constant voltage, p-n junction diode 26 poled so that current from source 10 flows through it in the inverse or high resistance direction. The emitter of transistor 20 is connected to the common terminal of resistor 25 and the diode 26. The collector of transistor 20 is connected to the base of transistor 21. The emitter of transistor 21 is connected to the positive terminal of the supply source 10 and the collector of transistor 21 is connected to the common terminal of resistors 12 and 13.

The operation of the current supply circuit of Fig. 1 may be analyzed as follows: An increase of the voltage of battery 10, for example, will cause the voltage across the load to increase, thereby making the base of transistor 20 relatively more positive with respect to its emitter. As a result, the current flowing from the source 10 into the emitter and out of the base of transistor 21 and into the collector of transistor 20 is increased. Therefore, the current flowing out of the collector of transistor 21 and through the resistance 13, 18 is also increased. The resulting increase of voltage drop across resistance 13, 18 causes the rise of load voltage to be minimized. For a decrease of supply voltage, of course, the current flowing out of the collector of transistor 21 and through the resistance 13, 18 decreases to cause the voltage drop across resistance 13, 18 to decrease for the purpose of minimizing the decrease of load voltage.

Assume now that the load increases slightly to cause an increase of voltage drop in the current supply circuit and a resulting decrease of load voltage. The decrease of load voltage causes the current flowing into the emitter and out of the collector of transistor 21 and through the resistance 13, 18 to decrease. The resulting change of voltage drop across resistance 13, 18 due to the current change therethrough causes the change of load voltage to be minimized. As the load is further increased the multicontact electromagnetic device 14 is actuated to close a first of its contacts, then a second of its contacts while the first contact remains closed, and so on. In other words, the resistance 13, 18 is reduced in steps as the load current increases, and vice versa. The voltage drop produced across the resistance 13 for regulating the load voltage is thus controlled jointly by the current flowing to the resistance through the shunt transistor 21 in response to load voltage changes to supplement the load current flowing through the resistance and by the magnitude of the resistance 13, 18 which is controlled by the electromagnetic device 14 in response to load current. The provision of the means for varying the resistance 13, 18 in response to load current changes greatly reduces the current required to be supplied through the shunt transistor 21 to the resistance 13, 18 at zero load. The load voltage may be set at a desired value by adjusting the variable tap of potentiometer 23.

In the current supply circuit of Fig. 2, current is supplied from battery 30 to a load 31 through a load circuit comprising a resistor 32 in a current path connecting the positive battery terminal to the positive load terminal and a resistor 33 and a p-n-p type transistor 34, in series, in a current path connecting the negative terminal of battery 30 to the negative load terminal. In addition to the transistor 34, there are provided in the regulating circuit transistors 35 and 36, each of the p-n-p type, and a transistor 37 of the n-p-n type. There is provided a multicontact electromagnetic device 38, like the device 14 of Fig. 1, having a winding 39, an armature 40 and a plurality of contacts 41, only three of which are shown, and a plurality of resistors 42, one for each of the contacts 41. Actuation of the armature 40 causes one or more of the resistors 42 to be connected in parallel across the portion of the load circuit which comprises resistor 33 and transistor 34 in series. A current path comprising in series a constant voltage p-n junction diode 43 and a resistor 44 is connected across the load, the diode 43 being poled so that current flows through it in the inverse or high resistance direction. The base of transistor 35 is connected to the common terminal of diode 43 and resistor 44, the collector of transistor 35 is connected through winding 39 to the negative terminal of battery 30 and the emitter of transistor 35 is connected through a variable resistor 45 to the positive terminal of battery 30.

With zero current supplied to the load 31, for example, the substantially constant voltage across the diode 43 is impressed upon a circuit which may be traced from the base of transistor 35 through diode 43 and through resistors 32 and 45, in series, to the emitter of transistor 35. Since the voltage impressed upon the emitter-base circuit of transistor 35 is substantially constant for this no load condition, a substantially constant current will flow out of the collector of transistor 35 and through the winding 39. In fact, for any fixed load condition, the current flowing through winding 39 will be substantially constant and independent of voltage changes of battery 30. As the load current increases, the voltage across the resistor 32 will increase to cause the voltage impressed upon the circuit connecting the emitter and base of transistor 35 to increase. The voltage drop across resistor 45 in the emitter-base circuit due to the emitter current flowing therethrough, may be varied by varying the resistance of resistor 45 to thereby adjust the potential of the emitter with respect to the base potential and, therefore, the collector current flowing through winding 39. For example, the current through winding 39 may be adjusted by varying the resistor 45 so that the armature 40 will be actuated to close a first of contacts 41 when the load current is increased to 80 percent of the maximum load current, a second of the contacts, in addition to the first, when the load current is 82 percent of maximum, a third of the contacts, in addition to the first and second, when the load current reaches 84 percent of the maximum, etc. In this way, the resistance of the shunt current path across the portion of the load circuit comprising resistor 33 and transistor 34, in series, is reduced to increase the current which can be supplied to the load without exceeding the safe operating limits of the series transistor 34.

There is connected across the load a voltage divider comprising in series a resistor 50, a potentiometer 51 and a resistor 52. The base of transistor 37 is connected to the variable tap of potentiometer 51. There is also connected across the load 31 a current path comprising, in series, a resistor 53 and a constant voltage, p-n junction diode 54, the diode 54 being poled so that current flows through it in the inverse or high resistance direction. The emitter of transistor 37 is connected to the common terminal of resistor 53 and the diode 54. The collector of transistor 37 is connected to the base of transistor 36. The emitter of transistor 36 is connected to the positive terminal of battery 30 and its collector is connected through a resistor 55 and through resistor 33 to the negative battery terminal. The common terminal of resistor 55 and the collector of transistor 36 is connected to the base of transistor 34.

When an increase of load voltage occurs, for example, the base of transistor 37 is made relatively more positive with respect to its emitter potential to cause an increase of current flowing in the current path from the positive terminal of battery 30 into the emitter and out of the base of transistor 36 and into the collector of transistor 37. As a result, the current flowing out of the collector of transistor 36 and through resistors 55 and 33 to the negative battery terminal is increased. The increased current flow through resistors 55 and 33 has two effects. One effect is to make the base of transistor 34 relatively more positive or less negative with respect to the emitter potential of the transistor. This effect produces a decrease of the current flowing into the emitter and out of the collector of transistor 34. In other words, the effect is to increase the voltage drop between the emitter and collector electrodes of transistor 34. The other effect of the increased collector current of transistor 36 is to increase the voltage drop across the resistor 33. Thus a change of load voltage is compensated by the resulting change of voltage drop across the portion of the load circuit comprising resistor 33 and the transistor 34, in series, to cause the load voltage change to be minimized. The load voltage may be set at a desired value by adjusting the variable tap of potentiometer 51.

The regulator comprising transistors 34, 36 and 37 functions both as a series transistor regulator and as a shunt transistor regulator, the relative effectiveness of the series regulation and the shunt regulation depending upon the resistance ratio of the resistors 55 and 33. If the resistance of resistor 55 were much larger than the resistance of resistor 33, the shunt regulation might be negligibly small compared to the series regulation. At the other extreme, if the resistance of resistor 33 were much larger than the resistance of resistor 55, the series regulation might be negligibly small compared to the shunt regulation. The optimum resistance values of resistors 55 and 33 may be found empirically. If, for example, the ratio of supply voltage 30 to load voltage 31 is relatively small, the resistance ratio of resistor 55 to resistor 33 should preferably be relatively large. Using a 48-volt battery for the supply source 30, suitable resistance values for resistors 55 and 33 were found to be 270 ohms and 80 ohms, respectively, for a 24-volt load voltage and 110 ohms and 100 ohms, respectively, for a 10-volt load voltage.

In Fig. 1, the resistor 12 and the winding 15 may be connected in either the positive or the negative lead going to the load. It is required, however, in Fig. 1, that the resistance 13,18 be inserted in the negative lead. It will be obvious from the disclosures of my prior patent applications, supra, that the circuit may be modified to insert the resistance 13,18 in the positive load lead by using an n-p-n type transistor 21 and a p-n-p type transistor 20. Similarly, the circuit of Fig. 2 may be modified to use n-p-n type transistors 34, 35 and 36 and a p-n-p type transistor 37 and inserting the resistor 33 and transistor 34 in the lead going to the positive load terminal.

What is claimed is:

1. Apparatus for supplying current from a current supply source through a load circuit to a load comprising a first and a second regulating means, means for impressing upon one of said regulating means a voltage which varies in response to load voltage changes, means for impressing upon the other of said regulating means a voltage which varies in response to changes of load current, impedance means in said load circuit in series with said load, means under control of said first regulating means for varying the impedance of said impedance means, and a shunt current path under control of said second regulating means for supplying current from said supply source to said impedance means to supplement the load current flowing through said impedance means.

2. Apparatus for supplying current from a current supply source through a load circuit to a load, a first variable impedance means in said load circuit in series with said load, a shunt current path comprising a second variable impedance means for controlling the supply of current from said supply source through said first variable impedance means to supplement the load current flowing through said first variable impedance means, means responsive to load voltage changes for varying one of said variable impedance means and means responsive to load current changes for varying the other of said variable impedance means.

3. Apparatus for supplying current from a current supply source through a load circuit to a load comprising impedance means in said load circuit in series with said supply source and said load, means responsive to load voltage changes for varying the impedance of said impedance means and means responsive to changes of current supplied to said load for varying the impedance of a shunt path across said impedance means.

4. Apparatus for supplying current from a direct-current supply source through a load circuit to a load comprising resistance means connected in series with said supply source and said load, a second circuit for supplying current from said supply source to said resistance means, means responsive to load voltage for controlling the current in said second circuit and means responsive to load current for controlling the resistance of said resistance means.

5. In combination, means for supplying current from a direct-current supply source to a load circuit including a load, a first resistor in said load circuit in series with said supply source and said load, a second circuit for supplying current from said supply source to said resistor, said second circuit comprising a first transistor having a collector, an emitter and a base, a second transistor having a collector, an emitter and a base, means for conductively connecting the base of said first transistor to the collector of said second transistor, a voltage divider connected across said load, means for connecting the base of said second transistor to said voltage divider, a shunt current path connected across said load comprising in series a second resistor and a p-n junction diode, means for connecting the emitter of said second transistor to the common terminal of said second resistor and said p-n junction diode, a plurality of resistors, and a multicontact electromagnetic means responsive to load current for connecting said plurality of resistors successively in current paths shunting said first resistor as the load current changes in one sense and for similarly disconnecting said plurality of resistors as the load current changes in the opposite sense.

6. In combination, means for supplying current from a direct-current supply source to a load circuit including a load, a first transistor having a plurality of electrodes comprising a collector, an emitter and a base, means for connecting the emitter and collector electrodes of said first transistor into said load circuit so that a portion at least of the load current flows into one and out of the other of said collector and emitter electrodes, a first resistor in series in said load circuit, a second resistor, a second transistor having a plurality of electrodes comprising an emitter, a collector and a base, means for supplying current from said direct-current source into one and out of the other of said emitter and collector electrodes of said second transistor and through said first and second resistors, means for controlling the base potential of said first transistor in response to voltage changes across said second resistor, means for controlling the potential of the base of said second transistor with respect to its emitter potential in response to changes of load voltage to thereby control the voltage across said second resistor, a third transistor having a plurality of electrodes comprising an emitter, a collector and a base, a multicontact electromagnetic device having an operating winding, a variable resistor, means for supplying current from said supply source to said winding through a circuit comprising the emitter and collector electrodes of said third transistor and said variable resistor connected to said emitter electrode of said third transistor, a plurality of resistors associated with the contacts, respectively, of said electromagnetic device, means responsive to load current changes for controlling the potential of the base of said third transistor with respect to its emitter potential to thereby control the current supplied to said winding, and means comprising said electromagnetic device for connecting said plurality of resistors successively in current paths shunting said first resistor and the collector and emitter electrodes of said first transistor in series as the load current changes in one sense and for similarly disconnecting said plurality of resistors as the load current changes in the opposite sense.

7. Apparatus for supplying current from a direct-current supply source to a load circuit including a load comprising a first and a second resistor each having a first and a second terminal, a first and a second transistor each having a plurality of electrodes comprising an emitter, a collector and a base, a first circuit comprising said supply source, the emitter and collector electrodes of said first transistor and said first and second resistors all in series, the first terminal of said first resistor and the first terminal of said second resistor being conductively connected, a second circuit comprising said supply source, said load, the collector and emitter electrodes of said second transistor and said second resistor all in series, means for connecting the base of said second transistor to the second terminal of said first resistor, and means for deriving from said load circuit and impressing upon the base of said first transistor with respect to the potential of its emitter a potential for regulating the supply of current from said supply source to said load.

8. Apparatus for supplying current from a direct-current supply source to a load circuit including a load comprising a first and a second resistor each having a first and a second terminal, a first and a second transistor each having a plurality of electrodes comprising an emitter, a collector and a base, a first circuit comprising said supply source, the emitter and collector electrodes of said first transistor and said first and second resistors all in series, the first terminal of said first resistor and the first terminal of said second resistor being conductively connected, a second circuit comprising said supply source, said load, the collector and emitter electrodes of said second transistor and said second resistor all in series, means for connecting the base of said second transistor to the second terminal of said first resistor, and means for impressing upon the base of said first transistor with respect to the potential of its emitter a potential having variations corresponding to load voltage changes for minimizing changes of said load voltage.

9. Apparatus for supplying current from a direct-current supply source having a positive and a negative terminal to a load circuit including a load comprising a current path connecting the positive terminal of said source to the positive load terminal, a first transistor of the p-n-p type having an emitter, a collector and a base, a first and a second resistor each having a first and a second terminal, means for connecting the emitter of said first transistor to the negative load terminal, means for connecting the first terminal of each of said resistors to the collector of said first transistor, means for connecting the second terminal of said first resistor to the negative terminal of said supply source, a second transistor of the p-n-p type having a collector, an emitter and a base, means for collecting the emitter of said second transistor to the positive terminal of said supply source, means for connecting the collector of said second transistor to the second terminal of said second resistor and to the base of said first transistor, and means for impressing upon the base of said second transistor with respect to the potential of its emitter a potential for controlling the current supplied to said load.

10. Apparatus for supplying current from a direct-current supply source having a positive and a negative terminal to a load circuit including a load comprising a current path connecting the positive terminal of said source to the positive load terminal, a first transistor of the p-n-p type having an emitter, a collector and a base, a first and a second resistor each having a first and a second terminal, means for connecting the emitter of said first transistor to the negative load terminal, means for connecting the first terminal of each of said resistors to the collector of said first transistor, means for connecting the second terminal of said first resistor to the negative terminal of said supply source, a second transistor of the p-n-p type having a collector, an emitter and a base, means for collecting the emitter of said second transistor to the positive terminal of said supply source, means for connecting the collector of said second transistor to the second terminal of said second resistor and to the base of said first transistor, a third transistor of the n-p-n type having a collector, an emitter and a base, means for connecting the base of said second transistor to the collector of said third transistor, and means for impressing upon a circuit connecting the base and emitter of said third transistor a voltage having variations corresponding to voltage changes across said load.

References Cited in the file of this patent

UNITED STATES PATENTS

| 1,487,108 | Knoop | Mar. 18, 1924 |
| 2,403,637 | Christie | July 9, 1946 |
| 2,417,272 | Short | Mar. 11, 1947 |

FOREIGN PATENTS

| 472,326 | Great Britain | Sept. 22, 1937 |
| 763,243 | France | Apr. 26, 1934 |
| 875,715 | France | June 29, 1942 |